(12) United States Patent
Bak

(10) Patent No.: US 8,263,266 B2
(45) Date of Patent: Sep. 11, 2012

(54) ELECTRODE ASSEMBLY AND SECONDARY BATTERY HAVING THE SAME

(75) Inventor: Hyorim Bak, Youngin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 716 days.

(21) Appl. No.: 12/367,313

(22) Filed: Feb. 6, 2009

(65) Prior Publication Data

US 2009/0253043 A1    Oct. 8, 2009

(30) Foreign Application Priority Data

Apr. 7, 2008   (KR) .................. 10-2008-0032221

(51) Int. Cl.
*H01M 2/16* (2006.01)
(52) U.S. Cl. ................ 429/246; 429/231.9; 429/231.95
(58) Field of Classification Search .................. 429/246, 429/231.9, 231.95
See application file for complete search history.

(56) References Cited

U.S. PATENT DOCUMENTS 6,001,139 A * 12/1999 Asanuma et al. ............ 29/623.3
2006/0019151 A1 * 1/2006 Imachi et al. ................. 429/128

FOREIGN PATENT DOCUMENTS

| JP | 2001-338639 A | 12/2001 |
| JP | 2006-134770 A | 5/2006 |
| KR | 2004-0096203 A | 11/2004 |
| KR | 10-2000701068 A | 11/2007 |

* cited by examiner

*Primary Examiner* — Helen O Conley
(74) *Attorney, Agent, or Firm* — Knobbe, Martens, Olson & Bear LLP

(57) ABSTRACT

A secondary battery, which may include an electrode assembly, a can having an upper opening to receive the electrode assembly and a cap assembly finishing the opening of the can is disclosed. The electrode assembly may include a positive electrode plate provided with a positive electrode active material layer, a negative electrode plate provided with a negative electrode active material layer, a separator interposed between the positive electrode plate and the negative electrode plate and an insulation coating layer coated on the positive electrode plate. The insulation coating layer may includes a first coating layer coated on the positive electrode coating portion. The insulation coating layer may contain olivine type lithium phosphate compound. A second coating layer coated on the first coating layer may contain ceramic powder and a binder.

14 Claims, 2 Drawing Sheets

ELECTRODE ASSEMBLY AND SECONDARY BATTERY HAVING THE SAME

CROSS-REFERENCE TO RELATED APPLICATION

This application is based on and claims priority to Korean Patent Application No. 10-2008-0032221 filed on Apr. 7, 2008 in the Korean Intellectual Property Office (KIPO), the entire contents of which are hereby incorporated by reference.

BACKGROUND OF THE INVENTION

1. Field of the Invention

The present invention relates to a secondary battery, and more particularly, to a secondary battery with improved durability and thermal stability.

2. Description of the Related Art

A secondary battery is a power supply that has ultra-light weight, high energy density, high output voltage, a low self-discharging rate, environment-friendliness, and a long lifetime. Accordingly, there has been much recent interest in secondary batteries.

SUMMARY OF THE INVENTION

Certain inventive aspects of the present invention provide a secondary battery with improved durability and thermal stability.

According to one aspect an electrode assembly includes a positive electrode plate comprising a positive electrode active material layer, a negative electrode plate comprising a negative electrode active material layer, a separator interposed between the positive electrode plate and the negative electrode plate and at least one insulation coating layer coated on the positive electrode plate.

In some embodiments the insulation coating layer includes a first coating layer coated on the positive electrode coating portion. In some embodiments the first coating layer includes olivine type lithium phosphate compound. In some embodiments a second coating layer is coated on the first coating layer. In some embodiments the second coating layer includes ceramic powder or a binder. In some embodiments an electric conductivity of the first coating layer is higher than that of the positive electrode active material layer. In some embodiments a third coating layer is formed of material the same as the second coating layer. In some embodiments a third coating layer is formed on a surface of the negative electrode plate closest to a surface of the positive electrode plate.

In some embodiments the positive electrode coating portion comprises $LiCoO_2$. In some embodiments the olivine type lithium phosphate compound comprises $LiFePO_4$. In some embodiments the olivine type lithium phosphate compound comprises 1 to 5 wt % of the positive electrode active material included in the positive electrode active material layer. In some embodiments a thickness of the first coating layer comprises 1 to 10 μm. In some embodiments a total thickness of the first and second coating layers comprises 3 to 12 μm.

In some embodiments the second coating layer is formed by coating ceramic paste made by mixing the binder and solvent with the ceramic powder. In some embodiments the ceramic powder includes at least one material selected from the group consisting of alumina, silica, zirconia, zeolite, magnesia, titanium oxide and barium titanate.

According to another aspect a secondary battery includes an electrode assembly, a can having an upper opening to receive the electrode assembly and a cap assembly finishing the opening of the can. In some embodiments the electrode assembly includes a positive electrode plate comprising a positive electrode active material layer. In some embodiments the electrode assembly includes a negative electrode plate comprising a negative electrode active material layer. In some embodiments the electrode assembly includes a separator interposed between the positive electrode plate and the negative electrode plate. In some embodiments the electrode assembly includes an insulation coating layer coated on the positive electrode plate. In some embodiments the insulation coating layer includes a first coating layer coated on the positive electrode coating portion. In some embodiments the first coating layer contains olivine type lithium phosphate compound. In some embodiments the insulation coating layer includes a second coating layer coated on the first coating layer. In some embodiments the second coating layer contains ceramic powder or a binder. In some embodiments the olivine type lithium phosphate compound comprises $LiFePO_4$.

An apparatus according to some of the described embodiments and the illustrated figures can have several aspects, no single one of which necessarily is solely responsible for the desirable attributes of the apparatus. The above and other aspects, features and advantages of the present invention will be more apparent from the following "Detailed Description" taken in conjunction with the accompanying drawings. After considering this discussion one will understand how the features of this invention provide advantages that include the ability to make and use the present invention.

DETAILED DESCRIPTION

Figure 1:
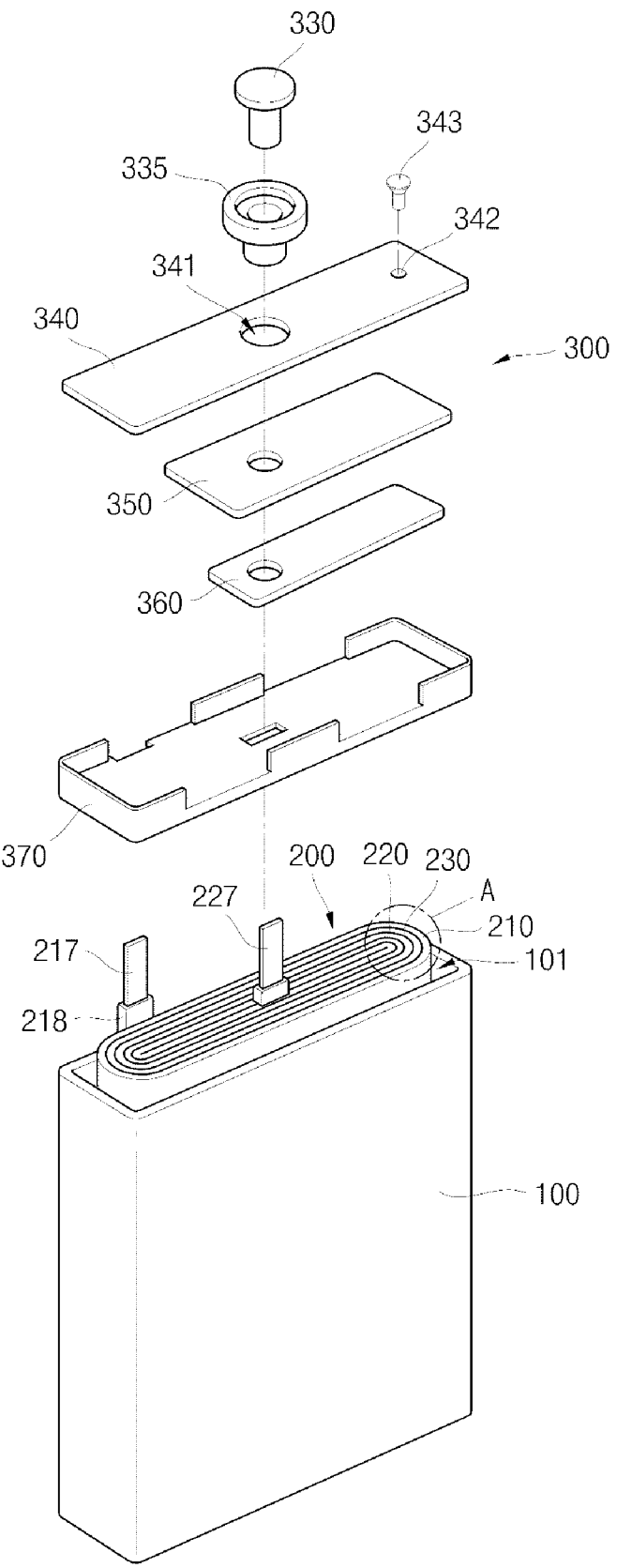
FIG. 1 is an exploded perspective view of a secondary battery according to one embodiment of the present invention.

Hereinafter, certain aspects of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

In one aspect a secondary battery may comprise a nickel-hydrogen (Ni-MH) battery and/or a lithium ion (Li-ion) battery according to a type of electrode active material. Particularly, the lithium ion battery may comprise a liquid electrolyte, a solid polymer electrolyte or a gel phase electrolyte according to a kind of the electrolyte. In addition, the lithium ion battery may comprise a can type, a pouch type, etc. according to a shape of a container receiving an electrode assembly.

The lithium ion battery can provide an ultra-lightweight battery because its energy density per weight is much higher than that of a disposable battery. Average voltages per a cell of the lithium ion battery and other secondary battery such as a Ni—Cd battery or a Ni-MH battery are respectively 3.6V and 1.2 V. Thus, the lithium ion battery is more compact by three times compared than other secondary batteries. In addition, a self-discharging rate of the lithium ion battery is less than 5% a month at 20° C. In comparison the self-discharging rate of the lithium ion battery corresponds to about ⅓ of the self-discharging rate of either the Ni—Cd battery or the Ni-MH battery. The lithium ion battery is also environmentally friendly because it does not use heavy metals such as cadmium (Cd) or mercury (Hg). Further, under normal conditions the lithium ion battery is rechargeable more than 1,000 times. Thus, the lithium ion battery has been developed rapidly with recent development of information and communication technologies due to the advantages described above.

In conventional secondary batteries, a bare cell is formed by providing an electrode assembly. The electrode assembly includes a positive electrode plate, a negative electrode plate and a separator in a can. The can may comprise aluminum or aluminum alloy. A cap assembly closes an upper opening of the can. In some embodiments fabrication of the bare cell may also comprise injecting an electrolytic solution into the can and sealing the can.

In some embodiments either or both of the positive electrode plate and the negative electrode plate may comprise positive electrode and negative electrode active materials capable of releasing or absorbing lithium ions. The electrode active materials may include, lithium cobalt oxide, lithium manganese oxide or lithium nickel oxide. In some embodiments lithium cobalt oxide ($LiCoO_2$) is used as a main positive electrode active material because it is formed relatively easily and has excellent durability and thermal stability compared to other materials.

Figure 2:
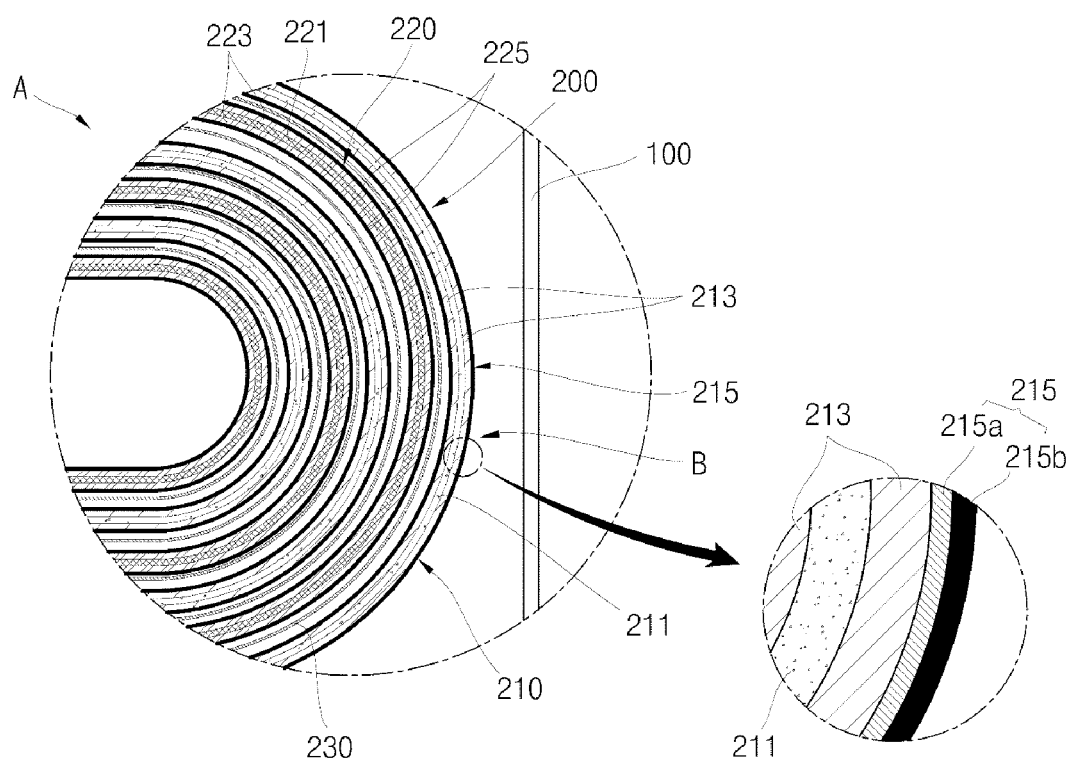
FIG. 2 is a magnified view illustrates the region 'A' of FIG. 1.

However, demand continues to increase for improvement of safety and performance in more severe environments such as in higher temperatures or with alternative foreign materials. Accordingly, demand has increased for a secondary battery having more excellent durability and thermal stability than batteries using conventional positive electrode active materials. Referring to FIGS. 1 and 2, a secondary battery includes a can 100, an electrode assembly 200 received in the can. The electrode assembly 200 includes an insulation coating layer 215 formed on a positive electrode active material layer. FIG. 1 also illustrates a cap assembly 300 sealing an opening of the can 100. Although FIG. 1 illustrates the secondary battery in a rectangular shape, one of ordinary skill in the art would recognize and appreciate the secondary battery may comprise other suitable geometrical shapes and configurations.

Similarly, one of ordinary skill will recognize and appreciate the can 100 housing the electrode assembly 200 may comprise any suitable material, including, for example, metal. In some embodiments the can 100 functions as a terminal in itself The can 100 includes an upper opening 101 through which the electrode assembly 200 is received.

As illustrated in FIG. 1 the cap assembly 300 includes an electrode terminal 330, a cap plate 340, an insulation plate 350, and a terminal plate 360. The cap assembly 300 is combined with the upper opening 101 of the can 100 with being insulated from the electrode assembly 200 by an insulation case 370, thereby sealing the can 100.

In some embodiments the electrode terminal 330 is connected to a positive electrode tab 217 of a positive electrode plate 210. In some embodiments the electrode terminal 330 is connected to a negative electrode tab 227 of a negative electrode plate 220. In some embodiments the electrode terminal functions as a positive electrode terminal or a negative electrode terminal.

The cap plate 340 is formed of a metal plate having size and shape corresponding to the upper opening 101 of the can 100. A terminal hole 341 of a predetermined size is formed in the middle of the cap plate 340. The electrode terminal 330 is inserted into the terminal hole 341. When the electrode terminal 330 is inserted into the terminal hole 341, a tube type gasket 335 combined to an outer surface of the electrode terminal 330 is inserted together with the electrode terminal 330 for insulation from the cap plate 340. An electrolytic solution injection hole 342 may be formed in a predetermined size at one side of the cap plate 340, and a safety vent (not shown) may be formed at the other side. The safety vent is formed integrally with the cap plate 340 by slimming thickness of a sectional surface of the cap plate 340. After the cap assembly 300 is combined to the upper opening 101 of the can 100, the electrolytic solution is injected into the can 100 through the electrolytic solution injection hole 342. Then, the electrolytic solution injection hole 342 is sealed by a stopper 343.

The electrode assembly 200 may include a positive electrode plate 210, a negative electrode plate 220, an insulation coating layer 215 coated on the positive electrode plate 210 and a separator 230 interposed between the positive electrode plate 210 and the negative electrode plate 220, which are wound in a jelly-roll type. On the other hand, as shown in the drawing, the electrode assembly 200 may further include a third coating layer 225 formed of ceramic material coated on the negative electrode plate 220.

The positive electrode plate 210 includes a positive electrode collector 211 made of aluminum foil and a positive electrode coating portion 213 containing lithium oxide coated on both surfaces of the positive electrode collector 211 as a main component. Lithium ions are reversibly inserted and released from the positive electrode coating portion 213. In some embodiments the positive electrode coating portion 213 is formed of material containing lithium cobalt oxide ($LiCoO_2$). Positive electrode non-coating portions are respectively formed at both ends of the positive electrode collector 211, where the positive electrode non-coating portions are regions on both or one surface of the positive electrode collector where the positive electrode coating portion 213 is not coated, but not shown in FIG. 2. A positive electrode tab 217 is provided on the positive electrode non-coating portion (not shown). An insulation tape 218 is wound on a part of the positive electrode tab 217 withdrawn out of the electrode assembly 200 to prevent an electrical short.

The negative electrode plate 220 includes a negative electrode collector 221 made of thin copper foil and a negative electrode coating portion 223 containing carbon material coated on both surfaces of the negative electrode collector 221 as a main component. Negative electrode non-coating portions are respectively formed at both ends of the negative electrode collector 221, where the negative electrode non-coating portions are regions on both or one surface of the negative electrode collector 221 where the negative electrode coating portion 223 is not coated, but not shown in FIG. 2. A negative electrode tab 227 is provided on the negative electrode non-coating portions (not shown). The insulation tape 218 is wound on a part of the negative electrode tab 227 withdrawn out of the electrode assembly 200 to prevent an electrical short.

The insulation coating layer 215 is coated on the positive electrode coating portion 213 of the positive electrode plate 210, and may formed of at least one layer. In addition, the insulation coating layer 215 may include a first coating layer 215a and a second coating layer 215b that are different from each other. Referring to a magnified circle for "B" region in FIG. 2, the first coating layer 215a is formed of material containing olivine type lithium phosphate. For example, the olivine type lithium phosphate may be formed of material containing $LiFePO_4$. The olivine type lithium phosphate compound has high thermal stability and oxygen is not generated at a temperature higher than 400° C. Further, the olivine type lithium phosphate compound has a lower cost than other similar materials that might be used for the first coating layer 215a. Further, the first coating layer may comprise an electric conductivity higher than an electric conductivity of the positive electrode active material layer.

According to one aspect of the electrode assembly 200, it is possible to prevent a short caused by cobalt that melts out of the positive electrode plate 210 and is deposited on the separator 230 according to repetition of charging/discharging. To prevent the short at least one layer of the first coating layer 215a containing the olivine type lithium phosphate compound is provided on the positive electrode coating portion 213. In addition, the electrode assembly 200 can prevent degradation of the secondary battery caused by heat generation related to structural damage of the positive electrode active material by preventing degradation of the positive electrode plate 210. By improving thermal stability then heat overcharge properties of the secondary battery are also improved.

Here, a content of the olivine type lithium phosphate compound is within the range of 1 to 5 wt % of the positive electrode active material included in the positive electrode coating portion 213. When the content of the olivine type lithium phosphate compound is less than 1 wt %, a thickness of the thin film coated on the positive electrode coating portion 213 is too thin to be effective. Accordingly, cobalt is melted out because direct degradation of the surface of the positive electrode plate 210 cannot be prevented. On the other hand, when the content of the olivine type lithium phosphate compound is more than 5 wt %, a capacity of the secondary battery may be reduced because the amount of the positive electrode active material is relatively reduced.

The second coating layer 215b is formed by coating ceramic paste made by mixing a binder and a solvent with ceramic powder on the first coating layer 215a. In addition, as described above, a third coating layer 225 formed of the same material as the second coating layer 215b may be formed on the surface of the negative electrode plate 220 that faces to the positive electrode plate 210.

The second and third coating layers 215b and 225 can function as the same as an olefin type film separator such as PP or PE. Here, the ceramic powder included the second and third coating layers 215b and 225 include at least one of the following materials: alumina, silica, zirconia, zeolite, magnesia, titanium oxide and barium titanate. Decomposition temperatures of the materials are higher than 1,000° C. Thus, when the secondary battery is manufactured using the materials, thermal stability against the internal short is improved. Accordingly, expansion of the internal short may be prevented even under the severe conditions such as if a metal nail were to pass through the secondary battery.

In addition, the polyolefin type film separator 230 shown in FIG. 2 contracts or melts at temperatures more than 100° C. However, the second and third coating layers 215b and 225 do not contract or melt even at temperatures greater than 100° C. Temperatures are often greater than 100° C. when the internal short occurs in the secondary battery. Nevertheless, despite the potential for contracting or melting both the positive electrode 210 including the second and third coating layers 215b and 225 as well as and the negative electrode 220 have excellent heat resistance.

In other words, in the case of the polyolefin type film separator 230 made of PP or PE, in addition to damaged portions by initial heat generation, the peripheral film of the damaged portions is subsequently contracted or melted at the time of the internal short. Thus, burned portion of the film separator 230 becomes wider, causing more severe expansion of the short portion.

However, in the positive electrode 210 and the negative electrode 220 (including both the second and third coating layers 215b and 225), even if an internal short is generated, only a small portion may be damaged around the short portion while the peripheral second and third coating layers 215b and 225 of the damaged portion are not contracted or melted. Thus, the internal short portion is not expanded.

In addition, the secondary battery has a high charge/discharge rate by including the ceramic powder of a high porosity. The electrolytic solution injection speed is improved because the second and third coating layers 215b and 225 quickly absorb the electrolytic solution. Thus, productivity of the secondary battery can be improved. In addition, according to a charge/discharge cycle, the electrolytic solution between the electrode plates is decomposed and exhausted. The second and third coating layers 215b and 225 having high absorption property absorb the electrolytic solution around them and supply the electrolytic solution to the electrode. Thus, durability of the battery is improved.

Here, the second and third coating layers 215b and 225 can function as the film type separator 230 made of PP or PE. Also, the polyolefin type film separator 230 and the ceramic coating layer 215 may be used together to improve safety. Or, only the second and third coating layers 215b and 225 may be formed instead of the polyolefin type film separator 230. In this time, any one or both of the second and third coating layers 215b and 225 may be coated on the electrode.

On the other hand, a total thickness of the first and second coating layers 215a and 215b may be within the range of 3 to 12 µm, and a thickness of the first coating layer 215a may be within the range of 1 to 10 µm. When the thickness of the first coating layer 215a is less than 1 µm, the first coating layer cannot prevent melting-out of cobalt caused by degradation of the surface of the positive electrode plate 210. On the other hand, when the thickness of the first coating layer 215a is more than 10 µm, the thickness of the second coating layer 215b is relatively reduced. Accordingly, thermal stability of the secondary battery is degraded and the internal short cannot be prevented. On the other hand, in some embodiments a thickness of the third coating layer is within the range of 3 to 12 µm.

As described above, the electrode assembly and the secondary battery having the same can improve thermal stability and durability by further including the first and second coating layers formed on the electrode.

The present invention will be explained in more detail with reference to examples and comparison examples below.

EXAMPLE 1

In the Example 1, $LiFePO_4$ was coated as a first coating layer on a positive electrode plate, and a ceramic layer was further coated as a second coating layer on the first coating layer, and a negative electrode plate was coated with nothing.

EXAMPLE 2

In the Example 2, only LiFePO$_4$ was coated as the first coating layer on the positive electrode plate, and the negative electrode plate was coated with a ceramic layer as a third coating layer.

EXAMPLE 3

In the Example 1, LiFePO$_4$ was coated as the first coating layer on the positive electrode plate, and a ceramic layer was further coated as the second coating layer on the first coating layer, and a negative electrode plate was coated with a ceramic layer as the third coating layer.

COMPARISON EXAMPLE 1

In the Comparison Example 1, the first to third coating layers were not coated on the positive electrode plate and the negative electrode plate.

COMPARISON EXAMPLE 2

In the Comparison Example 2, only LiFePO$_4$ was coated as the first coating layer on the positive electrode plate and the negative electrode plate was coated with nothing.

COMPARISON EXAMPLE 3

In the Comparison Example 3, only a ceramic layer was coated as the second coating layer on the positive electrode plate and the negative electrode plate was coated with nothing.

COMPARISON EXAMPLE 4

In the Comparison Example 4, the positive electrode plate was coated with nothing and the ceramic layer was coated as the third coating layer on the negative electrode plate.

COMPARISON EXAMPLE 5

In the Comparison Example 5, the positive electrode plate was coated with the ceramic layer as the second coating layer and the negative electrode plate was coated with the ceramic layer as the third coating layer.

Heat insulation overcharge property, internal short safety, nail-passing through property and durability were measured for the each example and comparison example and the results were shown in Table 1 below.

Heat Insulation Overcharge Property

Five secondary batteries according to each example and comparison example were overcharged with heat insulation in a voltage of 12V at 1 C and the states of the batteries were measured. Cases having no effect in the secondary battery were indicated as "L0", and cases of leakage generation were indicated as "L1", and cases of firing were indicated as "L4".

Internal Short Safety

In the five secondary batteries according to each example and comparison example, tests were performed about expansion of the internal short generated at a temperature higher than 100° C. where a separator is contracted or melted. Cases having expansion of the internal short were indicated as "NG", and cases having no expansion of the internal short were indicated as "OK".

Nail-passing Through Property

In the five secondary batteries according to each example and comparison example, passing-through tests were performed under the severe condition that passing-through speed of a nail pin was 5 mm/s, and a thickness of the nail pin was 2.5 mmΦ, a voltage was 4.31V. Cases without change were indicated as "L0" and cases of leakage generation were indicated as "L1" and cases of firing were indicated as "L4".

Durability

The five secondary batteries according to each example and comparison example were charged with constant current and voltage (CCCV) of 1.0 C/4.2V for 2.5 hours as a cut-off time and discharged with 1 C/cut-off and voltage of 3V. Capacity retention ratios were calculated as ratios (%) of a discharging capacity of the 300$^{th}$ cycle relative to a discharging capacity of the first discharging and average values were obtained.

TABLE 1

| | Positive electrode plate | | Negative electrode plate Ceramic layer | Heat | Internal | | |
|---|---|---|---|---|---|---|---|
| | LiFePO4 coating (first coating layer) | Ceramic layer coating (second coating layer) | coating (third coating layer) | insulation overcharge | short safety | Nail-passing through | Durability |
| Comparison Example 1 | X | X | X | 5L1 | NG | 5L4 | 77.1% |
| Comparison Example 2 | ○ | X | X | 5L0 | NG | 3L0, 2L4 | 79.3% |
| Comparison Example 3 | X | ○ | X | 2L1, 3L4 | OK | 2L0, 3L4 | 81.0% |
| Comparison Example 4 | X | X | ○ | 2L1, 3L4 | OK | 2L0, 3L4 | 81.6% |
| Comparison Example 5 | X | ○ | ○ | 3L1, 2L4 | OK | 4L0, 1L4 | 81.2% |
| Example 1 | ○ | ○ | X | 5L0 | OK | 5L0 | 86.1% |
| Example 2 | ○ | X | ○ | 5L0 | OK | 5L0 | 87.3% |
| Example 3 | ○ | ○ | ○ | 5L0 | OK | 5L0 | 86.5% |

With respect to the heat insulation overcharge property, in the Comparison Example 1, leakage was generated in all of five samples, and in the Comparison Examples 3 to 5, leakage and firing were generated. On the other hand, in the Comparison Example 2, there was no change in the appearance and the heat insulation overcharge property was good. That is the reason that the first coating layer coated on the positive electrode plate contributed to improve the heat insulation overcharge property. On the contrary, in the Examples 1 to 3, the heat insulation overcharge property was excellent.

With respect to the internal short safety property, in the Comparison Examples 1 and 2, expansion of the internal short was observed. On the contrary, in the Comparison Examples 3 and 5 and examples 1 to 3, expansion of the internal short was not observed. That is the reason that the ceramic layer having excellent thermal stability was coated on the positive electrode plate or the negative electrode plate in the Comparison Examples 3 and 5 and examples 1 to 3.

With respect to the nail-passing through property, in the Comparison Examples 1 to 5, firing or leakage was generated. On the contrary, in the examples 1 to 3, no change was generated. That is the reason that the first coating layer coated on the positive electrode plate contributed to improve the heat insulation overcharge property, as described above.

With respect to the durability property, in the Comparison Examples 1 to 3, the discharging capacity was low as 77 to 81%. On the contrary, in the Examples 1 to 3, the heat insulation overcharge property, internal short safety property and nail-passing through property were improved, and the discharging capacity was prominently increased to a level more than 86% because the second or third coating layer having good electrolyte absorption property.

As described above, the electrode assembly and secondary battery having the same according the present invention produce the following effects.

First, the first coating layer formed of the olivine type lithium phosphate compound is coated on the positive electrode active material layer, thereby improving thermal stability and heat insulation overcharge property prominently.

Second, the second coating layer formed of the ceramic material is further coated on the first coating layer, thereby improving safety to the internal short and the passing-through property in severe environment.

Third, the heat insulation overcharge property and safety to the internal short are secured and the ceramic material is coated on the electrode, thereby improving durability of the secondary battery.

The foregoing description details certain embodiments of the invention. It will be appreciated, however, that no matter how detailed the foregoing appears in the text, the invention can be practiced in additional ways. It should also be noted that the use of particular terminology when describing certain features or aspects of the invention should not be taken to imply that the terminology is being re-defined herein to be restricted to include any specific characteristics of the features or aspects of the invention with which that terminology is associated. Further, numerous applications are possible for devices of the present disclosure. It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. An electrode assembly, comprising:
    a positive electrode plate comprising a positive electrode active material layer;
    a negative electrode plate comprising a negative electrode active material layer;
    a separator interposed between the positive electrode plate and the negative electrode plate; and
    at least one insulation coating layer formed on the positive electrode plate between the positive electrode plate and the separator, wherein the at least one insulation coating layer comprises a first coating layer and a second coating layer, wherein the first coating layer comprises one or more olivine type lithium phosphate compounds, and wherein a content of the olivine type lithium phosphate compound included in the first coating layer is within the range of 1 to 5 wt % of the positive electrode active material included in the positive electrode active material layer.

2. The electrode assembly of claim 1, wherein the second coating layer comprises ceramic powder.

3. The electrode assembly of claim 1, wherein the positive electrode active material layer comprises $LiCoO_2$.

4. The electrode assembly of claim 1, wherein the one or more olivine type lithium phosphate compounds comprises $LiFePO_4$.

5. The electrode assembly of claim 1, wherein a thickness of the first coating layer is between about 1 to 10 μm.

6. The electrode assembly of claim 1, wherein a total thickness of the first and the second coating layers is between about 3 to 12 μm.

7. The electrode assembly of claim 2, wherein the second coating layer comprises binder, solvent, and ceramic powder.

8. The electrode assembly of claim 7, wherein the ceramic powder comprises at least one material selected from the group consisting of alumina, silica, zirconia, zeolite, magnesia, titanium oxide and barium titanate.

9. The electrode assembly of claim 1 further comprising a third coating layer formed on a surface of the negative electrode plate closest to a surface of the positive electrode plate.

10. The electrode assembly of claim 9, wherein the third coating layer comprises the same material as the second coating layer.

11. The electrode assembly of claim 1, wherein the first coating layer comprises an electric conductivity higher than an electric conductivity of the positive electrode active material layer.

12. A secondary battery, comprising:
    the electrode assembly of claim 1;
    a can having an upper opening to receive the electrode assembly; and
    a cap assembly to seal the opening of the can.

13. The secondary battery of claim 12, wherein the second coating layer comprises ceramic powder or a binder.

14. The secondary battery of claim 13, wherein the olivine type lithium phosphate compound comprises $LiFePO_4$.

* * * * *

UNITED STATES PATENT AND TRADEMARK OFFICE
CERTIFICATE OF CORRECTION

PATENT NO. : 8,263,266 B2  
APPLICATION NO. : 12/367313  
DATED : September 11, 2012  
INVENTOR(S) : Hyorim Bak Page 1 of 1

It is certified that error appears in the above-identified patent and that said Letters Patent is hereby corrected as shown below:

Title Page 1 (item 75 Inventor) at line 1, Change "Youngin-si, (KR)" for Hyorim Bak, to --Yongin-si, (KR)--.

In column 3 at line 56, Change "itself" to --itself.--.

In column 7-8 at line 4 (Table 1), Change "LiFePO4" to --$LiFePO_4$--.

Signed and Sealed this  
Twenty-sixth Day of February, 2013

Teresa Stanek Rea  
*Acting Director of the United States Patent and Trademark Office*